Feb. 5, 1952        W. H. FRITZ        2,584,858
PHOTOFLASH IGNITION APPARATUS AND METHOD

Filed May 29, 1947        2 SHEETS—SHEET 1

INVENTOR
WILLIAM H. FRITZ
BY
D. C. Harrison
ATTORNEY

Feb. 5, 1952 — W. H. FRITZ — 2,584,858
PHOTOFLASH IGNITION APPARATUS AND METHOD
Filed May 29, 1947 — 2 SHEETS—SHEET 2
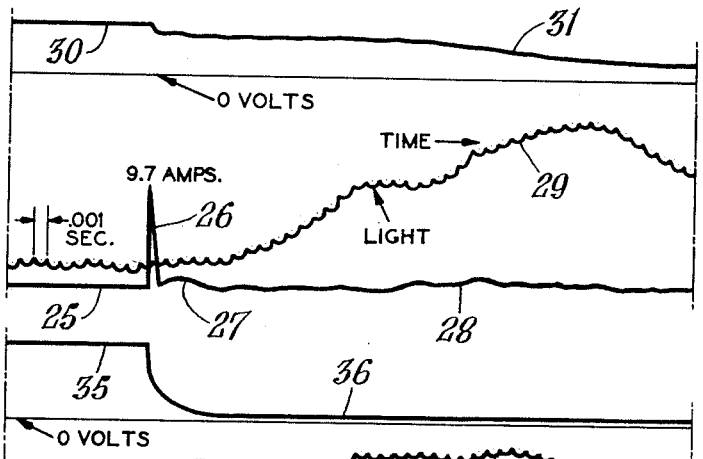
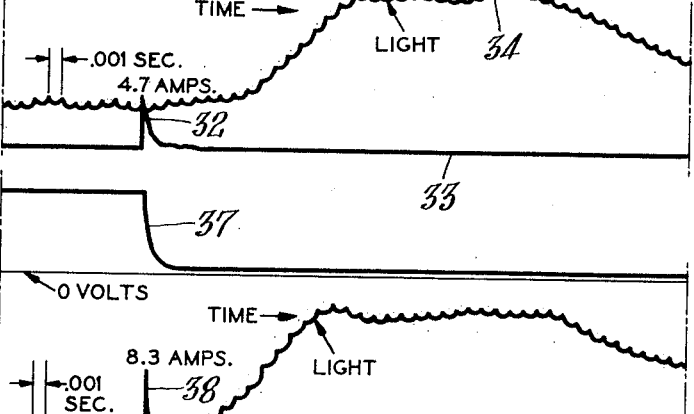
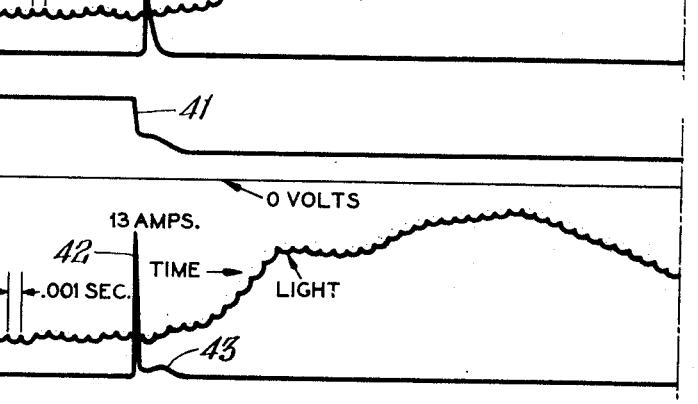
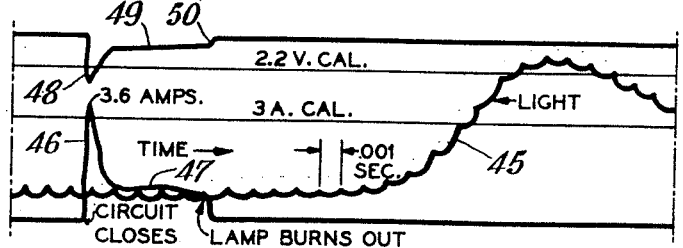
INVENTOR
WILLIAM H. FRITZ
BY
D. C. Harrison
ATTORNEY Patented Feb. 5, 1952

2,584,858

UNITED STATES PATENT OFFICE 2,584,858

PHOTOFLASH IGNITION APPARATUS AND METHOD

William H. Fritz, Mamaroneck, N. Y., assignor, by mesne assignments, to Union Carbide and Carbon Corporation, a corporation of New York Application May 29, 1947, Serial No. 751,224

7 Claims. (Cl. 67—31)

This invention relates to the firing of expendable type photoflash bulbs and has for an object to provide a compact lightweight device for firing such bulbs which is certain in action and free from variation in timing resulting from temperature, age, or internal resistance of dry cells as many occur when an electromagnetic release synchronizer is used for firing such bulbs. A further object is to provide a reliable device for firing a plurality of say three or four such photoflash bulbs in series that is economical of space. Yet another object is to provide a device for firing such a photoflash bulb without causing arcing and corrosion of the switch contacts when such switch is actuated by a camera shutter mechanism.

In order to time the opening of a camera shutter with the time of illumination from an expendable type photoflash bulb one expedient has been the use of an electromagnetic release type synchronizer. An objection has been that the use of dry cells of the same or different brands are not always uniform causing the time between the shutter opening and maximum illumination to be varied resulting in poor pictures.

An expedient that is intended to eliminate the disadvantages incident to the electromagnetic release type synchronizer has been the provision of a switch mechanism mechanically related to the shutter mechanism so that it closes in the proper time relationship to the opening of the shutter, such switch frequently being built into the camera. Such switches have remained closed for from 2 to 5 milliseconds and longer. They could not be instantaneous both because of mechanical inertia and because appreciable time is required for the battery to deliver enough energy to burn out the filament in the photoflash bulb. Neither could they be closed for a long and indefinite time because if the filament should not burn out the battery circuit might remain closed for too long a time. An oscillograph study has shown that about 5½ milliseconds was needed to cause the filament of such a bulb to burn out from the energy supplied by two type D dry cells. This means that a shutter actuated switch might open in less time than it takes the filament to burn out, and if it does open while battery current is flowing, arcing on and pitting of the switch contacts will take place. The delivery of more energy by increase in the battery voltage from the addition of more dry cells would make the battery heavier and more cumbersome to carry. Also the increase in internal resistance of the battery from additional dry cells in series has prevented the available current through the filament from being as large as desired.

According to the present invention these disadvantages have been eliminated and more current and energy has been delivered to an expendable type photoflash bulb with a smaller size battery, so small in fact that it may be conveniently built into the small camera. Also the more rapidly opening shutter actuated switches have been free of the objectionable arcing that was previously inherent in them. Thus, a large amount of energy is now believed to be put into the filament in a shorter time and under higher voltage than had been done heretofore. Specifically a higher voltage compact type dry battery such as has been used in connection with hearing aids, discharges a small current to an electric condenser preferably of the dry electrolytic type in order to be of small and compact outside dimensions. A switch then closes a low impedance circuit to discharge the condenser into the bulb filament. When the energy supplied to the filament is at least about 12 milliwatt seconds and the discharge circuit impedance low, the filament burns out more readily in fact in about one half to 1.2 milliseconds so that current has ceased to flow when the switch responsive to shutter actuation opens with the result there is no longer any pitting of the contacts. The energy supplied may easily be large enough to supply 3 or 4 such photoflash bulbs in series with the result that all are fired simultaneously and their light peaks are synchronized, rather than having such bulbs fired in sequence as may occur when they are connected in parallel.

This application is a continuation-in-part of my abandoned application Serial No. 703,643, filed October 16, 1946, for Photoflash Ignition Apparatus and Method.

Referring to the drawings:

Fig. 4 shows three oscillograph records illustrating the timing and approximate magnitude of current, voltage and light occurring with this invention and with substantially a 15 volt discharge from a 1000 microfarad condenser;

Fig. 5 represents another three oscillograph chart in which 22½ volts were used with a 100 microfarad condenser for firing four photoflash lamps in series through 100 feet of twisted pair lamp cord size No. 18;

Fig. 6 is yet another oscillograph chart showing the results of using 22½ volts with a 100 microfarad condenser and one lamp;

Fig. 7 is still another oscillograph record of the discharge of a 250 microfarad condenser at 22½ volts for one bulb;

Fig. 8 is an oscillograph record of the firing of a photoflash bulb without a condenser from two type D dry cells giving about 3 volts.

Figure 1:
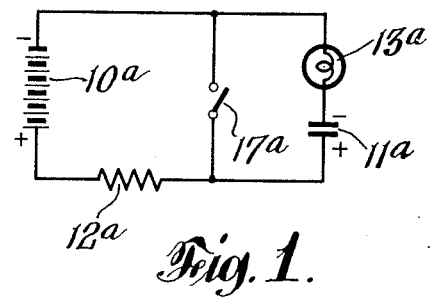
Fig. 1 is a wiring diagram of a preferred embodiment in which the current for charging the condenser passes through the photoflash bulb.

As shown in Fig. 1 a dry battery 10a supplies current for charging the condenser 11a. A resistance 12a prevents damage to the battery from a possible momentary short circuit. An expendable or filamentary type photoflash bulb 13a is adapted for reception within a bayonet slot in a socket. On insertion of the bulb 13a into its socket a circuit is automatically closed enabling current from the battery to charge the condenser 11a. The circuit through the battery 10a, resistance 12a and condenser 11a is of such high impedance, due to the internal resistance of the battery 10a, and the external resistance 12a that the photoflash bulb 13a could not be fired if placed in the circuit. To overcome this difficulty a low impedance circuit is provided excluding the battery 10a and resistance 12a but including a switch 17a, the bulb 13a and the condenser 11a. Upon closing the switch 17a the condenser 11a discharges through the bulb 13a causing the bulb to be fired by the momentary discharge from the condenser.

The dry battery is preferably of the 15, 22½, or 30 volt flat cell type common for wearable hearing aids. A 15 volt battery of this sort weighs only 1 ounce and is fairly compact being about $1\tfrac{1}{32}''$ x $\tfrac{5}{8}''$ x $1\tfrac{11}{32}''$. The condenser should be of a capacity large enough so that on discharge the current is sufficient to fire the bulb 13a. A high capacity low voltage electrolytic type condenser has been found best adapted for this purpose due to its space economy and its small bulk, the dry electrolytic type condenser providing large capacity with minimum size. A capacity of approximately 100 microfarads has proved adequate to flash one bulb. A dry battery of the above sort is not adapted for use with an electromagnetic release synchronizer since such device takes too much current for so small a battery. The resistance 12a should be high enough to protect the battery against momentary short circuit and yet of low enough resistance to enable the condenser to be charged by the battery in a few seconds. An ohmic resistance of about 2500 ohms has been found suitable, which with a 100 microfarad condenser requires only about 2½ seconds for the condenser to be charged from the battery. Batteries of this type have individual cells of approximately 4 ohms resistance per cell so that a 15 volt 10 cell battery has an internal resistance of about 40 ohms with the result that such a battery would be incapable of firing a photoflash bulb without the aid of the condenser 11a.

To fire the bulb 13a in Fig. 1 the switch 17a is closed thereby providing a low impedance circuit for discharge of the condenser 11a through the switch 17a and photoflash bulb 13a without the condenser discharge current having to pass through the battery 10a.

The photoflash bulb 13a is in series with the condenser 11a in the battery circuit so that current for charging the condenser passes through the bulb 13a but is not of high enough value to fire the bulb due to the internal resistance of the battery 10a and also due to the resistance 12a. The advantage of Fig. 1 resides in the fact that after being fired, the bulb 13a prevents the battery 10a from supplying leakage current to the condenser. With electrolytic type condensers leakage losses if supplied to the condenser may be large enough to shorten the shelf life of the battery to perhaps a third of what the shelf life of the battery 10a in Fig. 1 should be. In either embodiment however the drain on the battery for charging the condenser is so small that the lightweight battery described should be capable of firing photoflash bulbs hundreds of times in succession.

Figure 2:
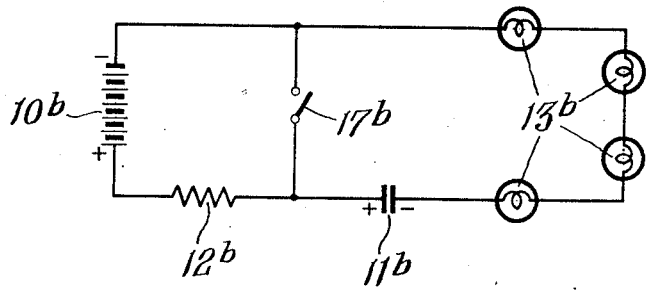
Fig. 2 is a wiring diagram showing four such bulbs connected in series for simultaneous firing.

In Fig. 2 is illustrated an arrangement for firing a plurality of bulbs simultaneously. The parts of the apparatus bear corresponding numerals and may be of the size and kind described in connection with Fig. 1 except that the several parts bear the exponent b in connection with their numerical designation. The battery 10b supplies charging current through resistance 12b and bulbs 13b to the condenser 11b. The bulbs 13b are arranged in series as illustrated so that on closing the switch 17b all of the bulbs are simultaneously fired from the condenser 11b through the low impedance circuit including the switch 17b but excluding the battery. Charging current for the condenser should pass through each bulb filament. It is therefore not necessary that an additional switch be provided.

Figure 3:
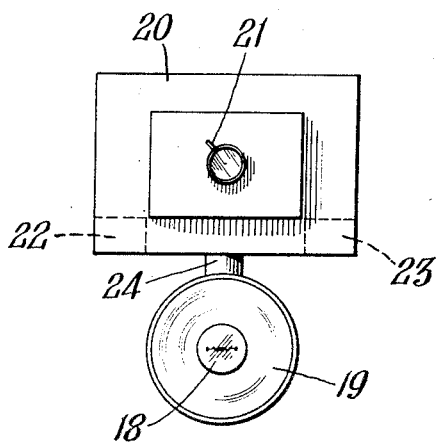
Fig. 3 is a conventional representation of a camera having a photoflash bulb and reflector attached thereto with the dry battery and condenser being small enough to be mounted within the camera casing.

In Fig. 3 a photoflash bulb 18 is shown withing the usual reflector 19 attached to a camera 20. Camera shutter may be actuated manually, pneumatically or electrically by movement of the projection 21. The camera 20 is of the type having a shutter mechanism which actuates a switch not shown for closing a low impedance circuit through a condenser for firing the photoflash bulb 18. The dry battery 22 may be located in any convenient portion of the camera case and so may the condenser 23. Both the dry battery and condenser together weigh less than the ordinary type D battery commonly used in flashlight batteries. The connection 24 between the camera and flashlight may be either permanent or removable but preferably the latter and it will be understood the flashlight may be placed on any of the sides or top of the camera as well as the bottom. Where the flashlight is removable and the camera carries the lightweight compact battery and condenser the outside of the camera case need only be provided with a receptacle similar in appearance to the flush-type wall or baseboard receptacle capable of receiving two prongs from a connector plugged therein for attachment of the flashlight to the camera.

The oscillograph records of Figs. 4 to 7 were taken with apparatus depicted in either Figs. 1 or 2, the Fig. 2 apparatus being used for a plurality of bulbs in series. The photoflash bulbs tested were usually of the type intended for a focal plane shutter and giving a long or sustained period of illumination and known to the trade as General Electric No. 6 photoflash bulb. The bulb used in Fig. 8 was of a type giving a less flat and sharper light peak and known to the trade as General Electric No. 5. In the tests depicted by Figs. 4 to 8 the switch closing the photoflash bulb circuit was a relay connected in a laboratory test arrangement, mechanically related to the oscillograph film rotation, so that the train of events occurring in the flash bulb might be recorded in the proper sequence.

In Fig. 4 line 25 is substantially the zero line indicating the absence of current from the condenser. A peak of substantially 9.7 amperes is shown by the line 26 indicating the discharge of a condenser of 1000 microfarads charged from a 15 volt source. Current flow indicated by the small hump 27 is believed to be due to current in the tube after the filament has burned out and resulting from gas conduction due to the burning of the primer coating of the electrodes of the bulb and to a residual charge in the condenser. By taking an experimental bulb having no foil but the usual filament and primer coating on the electrodes the same type small hump was found to exist indicating this to be probably due to the burning of the primer coating. Line 28 is slightly above zero, this being perhaps due to a similar phenomenon to that causing small hump 27. When excess voltage remains on the condenser after filament burn out, conduction of current occurs through the gases in the lamp during the combustion of the foil in the lamp. The serrated line 29 resulted from the use of a 1000 cycle tuning fork so that the time between peaks in $1/1000$ of a second. The ascending portion of the line 29 was also responsive to a photoelectric cell and this constituted a measure of the light or illumination given by the photoflash bulb. Knowing the time between small peaks in the line 29 to be $1/1000$ of a second it will be seen that the lateral separation at the base of the cusp 26 is slightly over .0005 second and less than .001 second. In other words the photoflash bulb filament in this No. 6 type bulb burned out in less than 1 millisecond under a charge of 15 volts and during a peak current of approximately 9.7 amperes. The flat portion of the line 30 indicates 15 volts on the condenser plates. At the time of closing the switch and discharging the condenser through the filament the voltage drops suddently as illustrated. The residual voltage indicated by the distance of the line 31 above the zero voltage line is due to the fact that the condenser was of large capacity requiring only a small portion of its total energy to be expended in burning out the filament. A major portion of the energy stored in the condenser remained as indicated by the voltage line 31, and it is graduall lost as this voltage line descends and approaches zero, due to leakage through the condenser, and in this particular case the descent is accelerated by conduction of current through the gaseous combustion products of primer and foil combustible. The condensers used in Figs. 4 to 7 inclusive were each of the dry electrolytic type for the sake of compactness in overall dimensions. The 1000 microfarad condenser used in the test depicted by Fig. 4 was of a type commercially known as a Mallory WP039. Immediately after firing the condenser residual energy was under pressure of substantially 12 volts, the maximum light delivered by the photoflash bulb occurred 15 to 43 milliseconds after the filament was fired. The average volts and average amperes supplied to the filament during the brief interval before it was burned out were determined with the aid of a planimeter and found to be 12.7 volts and 5.6 amperes indicating an energy of about 53 milliwatt seconds.

A summary of the results illustrated in Figs. 4 to 7 inclusive may be summarized as follows:

| Condenser Mfg. | Mallory | | Cornell-Dubilier | |
|---|---|---|---|---|
| Type | WP-039 | TC-2501 | BRH-501 | BRH-2525 |
| Rated Mfd | 1,000 | 100 | 100 | 250. |
| Rated working voltage | 15 | 25 | 50 | 25. |
| Size | 1 x 3'' | $1\frac{3}{16}$ x $1\frac{3}{16}$'' | $1\frac{3}{16}$ x $2\frac{1}{8}$'' | $1\frac{5}{16}$ x $2\frac{3}{8}$''. |
| Oscillograph Fig | 5 | 6 | 7 | 8. |
| Lamps fired | 1 No. 6 | 4 No. 6 + 100' cord. | 1 No. 6 | 1 No. 6. |
| Voltage | 15 | 22½ | 22½ | 22½. |
| Peak Amps | 9.7 | 4.7 | 8.3 | 13. |
| Cond. Volts after firing | 12 | 1.5 | 2 | 12. |
| Time for Max. Light, millisec | 15-43 | 15-33 | 13-32 | 11-38. |
| Time for Cond. Discharge, millisec | 0.8 | 3 | 1.2 | 0.5. |
| Avg. Volts } planimeter<br>Avg. Amps } | {12.7<br>{5.6 | 6.5<br>0.78 | 2.8<br>3.1 | 12.<br>4.9. |
| Milliwatt seconds | 53 | 14 | 10.4 | 29. |

In Fig. 5, 22½ volts was applied to a 100 microfarad condenser for firing 4 No. 6 photoflash bulbs in series with 100' of No. 18 duplex lamp cord. The peak 32 was only about 4.7 amperes due to the smaller capacity condenser and the larger resistance in the extreme circuit. The line 33 indicates that the filament burns out in approximately one millisecond, since it returns to alignment with the zero ampere line to the left of peak 32 after approximately that time interval. The line 34 shows the same 1000 cycle tuning fork photo and also that the light peak was flatter, due of course to a characteristic of a bulb and not to any bearing of this invention on the manner of firing. The line 35 represents pressure of 22½ volts on the condenser which dropped suddenly as illustrated to a lower level 36 indicating only a minor residual charge on the condenser.

In Fig. 6, 22½ volts were applied to a 100 microfarad condenser with results indicated, the current indicated by the line 38 rising to a peak of substantially 8.3 amperes at the time the voltage line 37 dropped. The small residual voltage on the condenser in Figs. 5 and 6 indicates substantially no current flow from the photoflash bulb as indicated by both the voltage and current lines after the filament burned out.

In Figs. 7, 22½ volts were applied to a 250 microfarad condenser indicating a peak of 13 amperes as shown at the line 42 and burning out the filament in about ½ millisecond. The hump 43 is believed due to the primer as mentioned in connection with Fig. 4. This primer caused discharge being reflected in the voltage curve 41.

In these tests the dry battery in each case was of the compact small current type commonly used with hearing aids. The condenser was of the type and size indicated and of the dry electrolytic type; the lightly etched condensers being preferable to the more heavily etched condensers. The energy stored by the condenser is proportioned to its capacity in farads multiplied by the square of the voltage and divided by two. Both the Nos. 5 and 6 type bulb have the same type and size filament. The filament had a resistance of about .2 to .5 ohm. The bulbs were provided with the usual metal foil strips in an atmosphere of oxygen under a slight pressure. These tests indicate that about 10 to 15 milliwatt seconds is desirable for firing one photoflash bulb while from 14 to 21 milliwatt seconds is desirable for firing 4 such bulbs in series. Since the energy varies with the square of the voltage at least about 15 volts has been found desirable in order to obtain a condenser of not too large a size. With 30 volts for firing one lamp and in order to get 12 milliwatt seconds of energy the condenser should be at least about 26.7 microfarads; with 22½ volts, 47.3 microfarads; with 15 volts, 107 microfarads; and with 7½ volts about 400 microfarads, all computed for giving about 12 milliwatt seconds of energy. The time of condenser discharge depends on the resistance and capacity of the circuit, the resistance of the condenser being difficult of determination. Examples of cameras for which the present invention is readily adapted for use include Leica and Argus types in which the photoflash bulb firing switch is actuated from the shutter tripping mechanism. The Eastman, Graflex, Ilex, and Wollensak shutters have switches built into the shutter mechanism. None of these switches responsive to shutter mechanisms are found to remain closed a shorter time than about 2 milliseconds. Yet each of the tests exemplified in Figs. 4 to 7 shows that at least the main portion of current flow through the filament had ceased before a lapse of 2 milliseconds. The examples shown in Figs. 5 and 6 take the longest time for the filament to burn out, yet even here if used with a rapid switch which stayed closed no longer than 2 milliseconds there would be little or no arcing at the switch contacts.

In Fig. 8 is shown an oscillograph of what happens under prior art conditions when no condenser is used and a No. 5 lamp having the same size filament as the No. 6 is fired directly from two type D dry cells giving about 3 volts. The line 46 shows a current peak of around 3.6 amperes quickly dropping as the filament became heated and its resistance increased. The current flow through the filament then remained at almost a fixed value as shown by the line 47 which had a value of about 1 ampere on its portion at the left and slightly less before the lamp burned out. From the time and light curve 45 it may be seen that the filament took approximately 5½ milliseconds or more to burn out. The voltage line 48 shows a steep drop at the time of maximum current peak limited by the internal resistance of the battery, the voltage rising as the current decreases and the voltage line 49 being almost but not quite a constant or a horizontal. The step 50 in the voltage line indicates where the lamp burned out and the battery voltage returned to its normal open circuit value.

Among the advantages of this invention may be mentioned the ability of firing a photoflash bulb through a low impedance circuit independent of the internal resistance of the battery. When a condenser of the dry electrolytic type is used it may be built into the camera as may also the dry battery. In Figs. 1 and 2 the photoflash bulb acts to open the circuit after the bulb has been fired and thus prevent the supply of leakage current to the condenser. The camera in Fig. 3 may be wired according to the showing in either Fig. 1 or 2 for closing the low impedance circuit in response to actuation of the shutter mechanism.

The shutter mechanism for closing the switch to discharge the condenser is mechanically timed to operate at a predetermined interval in advance of the shutter opening. There is no variation in this timed interval due to temperature and brand of dry cells used as may occur with use of the so-called electromagnetic release synchronizer. This invention is particularly adapted to the switches responsive to shutter mechanism since these switches customarily remain closed for a substantially longer period than the time required for the filament to burn out under a condenser discharge with the present invention. Without this invention and where a plurality of photoflash bulbs were fired from one battery, it had been customary to arrange the bulbs in parallel resulting in the illumination from the several bulbs not being synchronized. Under the present invention the bulbs may be arranged in series so that synchronous firing is assured. The shelf life of the batteries is not as vital a factor in the present invention as it is with the electromagnetic release synchronizer. The compact small current type dry cells customarily used with hearing aids are usually plastic sealed and less likely to leak than the dry type D cells. The steepness of the ascending portion of the current cusp of Figs. 4 to 7 from a condenser discharge depends on the inductance of the circuit while the descending portion depends on the resistance and capacity of the circuit. Some of the switches responsive to shutter mechanism stay closed for considerably longer than the two milliseconds mentioned. The switch used in closing the photoflash bulb circuit in tests shown in Figs. 4 to 7 was in a pair of relay contacts closed at the proper time by mechanical interrelation with the oscillograph used to record the traces shown. Several hundred photographs have been taken with a Leica camera experimentally modified so that a set of contacts is mechanically closed when the focal plane shutter is actuated by the shutter tripping button.

I claim:

1. The combination with a photoflash bulb of the expendable type having a conductor serving as an igniting element, of a condenser for firing said bulb on discharge, a flat multi-cell hearing aid type dry battery of at least 15 volts for charging said condenser, a resistance of over 1000 ohms in series with said battery but small enough to charge the condenser in substantially not more than about two and one-half seconds to limit charging current, and means forming a low impedance all metallic circuit except for said condenser through said condenser and bulb but excluding said battery, said bulb being in series with said condenser so that charging current for the condenser passes through said bulb without firing it and after being fired the bulb functions to keep the battery circuit open and prevent the supply of leakage current to the condenser, no circuit opening switch in addition to said bulb being needed, and said condenser being of a capacity cabable of discharging over 10.4 miliwatt seconds of energy but not substantially in excess of 53 milliwatt seconds of energy at the voltage used.

2. In an apparatus for firing a photoflash bulb of the expendable type having a conductor serving as an igniting element, including a dry battery, a condenser connected to be charged by said battery, a resistance limiting the current flow to the condenser, a low impedance circuit, including said bulb and condenser but excluding said battery and resistance, and a switch for closing said low impedance circuit, the combination therewith of the improvement enabling said apparatus to be compact and light in weight, said improvement including said battery being of the flat cell hearing aid type delivering so small a current as to be incapable of firing said bulb without said condenser and giving 15 to 30 volts, both said battery and condenser together weighing less than a type D dry cell, said bulb and condenser being in series in both the charging and discharging circuits, whereby, when said bulb has burned out, no circuit opening switch is needed to disconnect the condenser and battery, there being only one low impedance condenser discharge path and said switch being free of any current flowing through it when open and when said condenser discharge is not passing through it.

3. In apparatus for firing an expendable type photoflash bulb having a conductor serving as an igniting element, said apparatus comprising a dry battery, a receptacle for said bulb, a condenser of capacity for firing said bulb, circuit connections for charging said condenser from said battery, a limiting resistance in the condenser charging circuit, a low impedance circuit for discharging said condenser through said receptacle and a bulb therein, and a circuit closing switch in the low impedance circuit, the combination therewith of the improvement for eliminating the need for a circuit opening switch to prevent the battery drain of leakage current to said condenser and for eliminating the necessity for closing a switch to charge the condenser, said improvement including said receptacle for said bulb being in the condenser charging circuit and of the type whereby on insertion of the bulb in said receptacle the charging circuit is closed through the condenser, resistance, and battery, and on actuation of said switch for closing the low impedance circuit the condenser fires the bulb and opens said charging circuit, the only condenser discharge circuit being through the circuit closing switch for said low impedance circuit.

4. Apparatus according to claim 3 in which said condenser is of a capacity between 400 microfarads and 26.7 microfarads and the battery is of the flat cell hearing-aid type having a voltage between 7½ volts and 30 volts.

5. In apparatus for firing a plurality of expendable type photoflash bulbs each of which has a conductor serving as an igniting element, said apparatus including a dry battery, a condenser of capacity for firing said bulbs, circuit connections for charging said condenser from the battery, a current limiting resistance in said condenser charging circuit, a low impedance circuit for discharging said condenser through said bulbs but excluding said battery and resistance, and a circuit closing switch in said low impedance discharge circuit, the combination therewith of the improvement for insuring the simultaneous firing of said plurality of bulbs without expenditure of time and effort in balancing the resistances of circuits for each bulb, said improvement including said bulbs being in series with each other and in series with the condenser in both the charging and discharging circuits whereby the limiting resistance reduces the charging current to a value below that necessary to heat said igniting elements for firing said bulbs, said bulbs being fired simultaneously, irrespective of whether the connecting leads to one bulb are longer and of different resistance from those to another bulb, and whereby the condenser discharge circuit is opened in said bulbs, the only condenser discharge circuit including said low impedance circuit closing switch.

6. In apparatus for firing an expendable type photoflash bulb, said apparatus including a dry battery, an expendable type photoflash bulb having a conductor serving as an igniting element, a condenser of capacity for firing said bulb, circuit connections for charging said condenser from said battery, a current limiting resistance in said condenser charging circuit, a low impedance circuit for discharging said condenser through said bulb, and a circuit closing switch in the low impedance circuit, the combination therewith of the improvement for eliminating the need for a circuit opening switch to prevent the battery drain of leakage current to said condenser after the bulb has been fired whereby the battery is protected without such a circuit opening switch being present, said improvement including said bulb being in series with the condenser in its charging circuit whereby the limiting resistance reduces the charging current to a value below that necessary to heat said igniting element and fire said bulb, and after said bulb has been fired the condenser charging circuit is opened in said bulb, the only condenser discharge circuit being that through said circuit closing switch for said low impedance circuit.

7. In a method of firing a photoflash bulb of the expendable type in which a conductor serves as an igniting element, said method including charging a condenser from a battery of dry cells, and discharging the condenser through a low impedance circuit including said bulb but excluding the battery, the combination therewith of the improvement for protecting the battery against the drain of supplying condenser leakage current after said bulb has been fired and for eliminating the need for a circuit opening switch after the bulb has been fired, said improvement including charging said condenser through said photoflash bulb when the charging current is reduced to a value below that necessary to heat said igniting element to fire the bulb, manually closing only one low impedance circuit through the condenser and bulb, and opening said battery-condenser charging circuit in said photoflash bulb in response to the condenser discharge within less than a minor fraction of a second after actuating the circuit and irrespective of whether there be daylight or darkness in which the bulb is to be fired.

WILLIAM H. FRITZ.

REFERENCES CITED

The following references are of record in the file of this patent:

UNITED STATES PATENTS

| Number | Name | Date |
| --- | --- | --- |
| 1,932,098 | Boesser | Oct. 24, 1933 |
| 1,939,332 | Bouwers et al. | Dec. 12, 1933 |
| 2,071,370 | Williams | Feb. 23, 1937 |
| 2,196,604 | Galter | Apr. 9, 1940 |
| 2,279,477 | Mihalyi | Apr. 14, 1942 |
| 2,298,382 | Hutchinson, Jr., et al. | Oct. 13, 1942 |
| 2,391,611 | Back | Dec. 25, 1945 |
| 2,395,600 | Weisglass | Feb. 26, 1946 |
| 2,432,084 | Blair | Dec. 9, 1947 |
| 2,469,688 | Fuerst | May 10, 1949 |
| 2,486,010 | Edgerton | Oct. 25, 1949 |

FOREIGN PATENTS

| Number | Country | Date |
| --- | --- | --- |
| 462,953 | Great Britain | Mar. 18, 1937 |